(12) United States Patent
Raikh

(10) Patent No.: US 11,293,174 B2
(45) Date of Patent: Apr. 5, 2022

(54) SYSTEM AND METHOD FOR ATTACHING PANELS

(71) Applicant: Solaredge Technologies Ltd., Herzeliya (IL)

(72) Inventor: Michael Raikh, Rishon LeZion (IL)

(73) Assignee: Solaredge Technologies Ltd., Herzeliya (IL)

( * ) Notice: Subject to any disclaimer, the term of this patent is extended or adjusted under 35 U.S.C. 154(b) by 0 days.

(21) Appl. No.: 17/061,637

(22) Filed: Oct. 2, 2020

(65) Prior Publication Data

US 2021/0102370 A1    Apr. 8, 2021

Related U.S. Application Data

(60) Provisional application No. 62/910,026, filed on Oct. 3, 2019.

(51) Int. Cl.
| | | |
|---|---|---|
| *E04B 1/38* | (2006.01) | |
| *E04B 1/41* | (2006.01) | |
| *H02S 30/10* | (2014.01) | |
| *F16B 1/00* | (2006.01) | |
| *F16B 47/00* | (2006.01) | |

(52) U.S. Cl.
CPC ............... *E04B 1/40* (2013.01); *F16B 1/00* (2013.01); *F16B 47/00* (2013.01); *H02S 30/10* (2014.12); *F16B 2001/0035* (2013.01)

(58) Field of Classification Search
None
See application file for complete search history.

(56) References Cited

U.S. PATENT DOCUMENTS

| | | | |
|---|---|---|---|
| 2011/0283923 A1 | 11/2011 | Potter | |
| 2015/0237750 A1* | 8/2015 | Yang | ........................ F16B 1/00 206/45.2 |
| 2018/0195543 A1* | 7/2018 | Lynn | ..................... F16B 5/0635 |
| 2018/0195770 A1* | 7/2018 | Lynn | ..................... H02S 40/36 |
| 2018/0195771 A1 | 7/2018 | Lynn | |
| 2018/0281205 A1* | 10/2018 | Lynn | ....................... H01F 7/206 |
| 2020/0158152 A1* | 5/2020 | Chorny | ................ F16B 21/078 |

FOREIGN PATENT DOCUMENTS

WO    2017027758 A2    2/2017

OTHER PUBLICATIONS

Mar. 1, 2021—EESR—EP 20199915.8.

* cited by examiner

*Primary Examiner* — Basil S Katcheves
(74) *Attorney, Agent, or Firm* — Banner & Witcoff, Ltd.

(57) ABSTRACT

Apparatuses for locking PV panels to support structures, e.g., support beams. The support beams may be designed and built with corresponding connection elements, e.g., slots and tabs, which may be used to enable locking and unlocking of the PV panels on the support beams. Once in place, a ferromagnetic flap may be put into an engaged position, thereby closing and engaging a panel locking mechanism. The ferromagnetic flap may be lifted by using a magnet. The magnet may be may be embedded in a suction cup device which is designed to lift and maneuver an object with a relatively flat surface, e.g. a glass pane. The suction cup device may, when suction is applied, be attached to glass covering the PV panels, and thus the suction cup device may be used to move the PV panels.

22 Claims, 14 Drawing Sheets

SYSTEM AND METHOD FOR ATTACHING PANELS

CROSS-REFERENCE TO RELATED APPLICATIONS

The present application claims priority benefit of U.S. Provisional Patent Application No. 62/910,026, filed Oct. 3, 2019, entitled "SYSTEM AND METHOD FOR ATTACHING PANELS," which is hereby incorporated by reference in its entirety.

BACKGROUND

Photovoltaic solar panels, also referred to as solar panels or as photovoltaic (PV) panels, typically absorb sunlight and use irradiant energy in the sunlight in order to generate direct current (DC) electricity. PV panels include an array of photovoltaic cells. A plurality of photovoltaic cells joined together may also be referred to as a photovoltaic module. Some PV panels are packaged in a frame, often constructed of aluminum. Other PV panels are designed without the use of frames around the panels. A glass sheet usually covers the photovoltaic module, providing a protective layer on top of the photovoltaic module. The PV panels are often placed atop support structures, sometimes implemented as a framework of beams, (which may, for example, be constructed of aluminum, and/or other appropriate materials), which hold the PV panels in place, thereby ensuring that the PV panels are kept in a particular orientation and position. Once positioned and oriented in a particular way in relation to the support structures, the PV panels may be attached to the holding structures (e.g., the framework beams), so that the PV panels may not shift or fall, whether due to environmental conditions, catastrophic events, and so forth.

SUMMARY

The following summary presents a simplified summary of certain features. The summary is not an extensive overview and is not intended to identify key or critical elements.

Systems, apparatuses, and methods are described for locking PV panels to support structures, e.g., support beams. The support beams may be designed and built with corresponding connection elements, slots and tabs, by way of example, which may be used to enable locking and unlocking of the PV panels on the support beams. Once in place, a ferromagnetic flap may be put into an engaged position, thereby closing and engaging a panel locking mechanism. The ferromagnetic flap may be lifted by using a magnet. The magnet may be embedded in a suction cup device, which is designed to lift and maneuver an object with a relatively flat surface, e.g. a glass pane. The suction cup device may, when suction is applied, be attached to glass covering the PV panels, and thus the suction cup device may be used to move the PV panels.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1A:
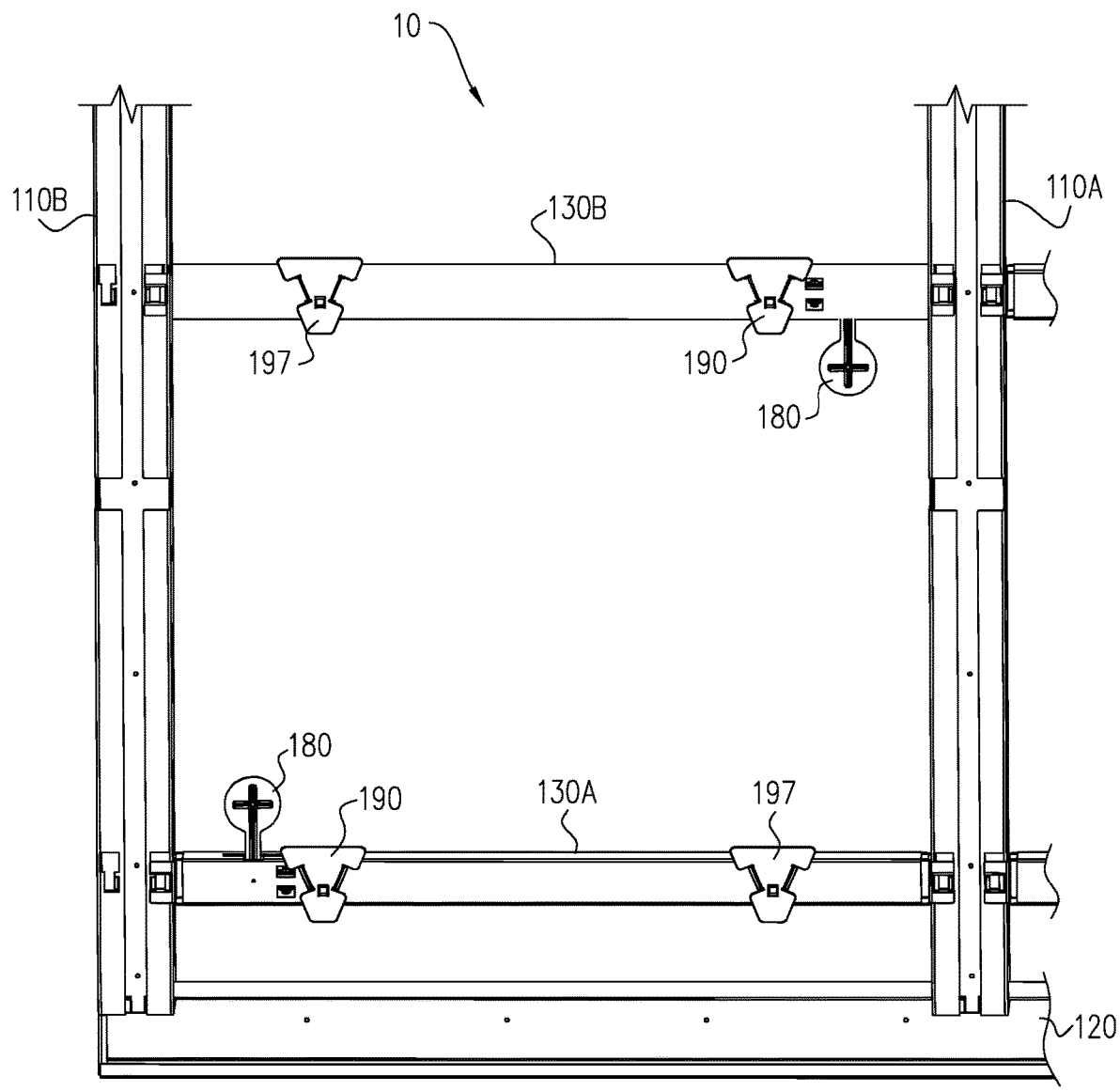
FIG. 1A shows a support structure and locking mechanism for at least one photovoltaic (PV) panel.

The accompanying drawings, which form a part hereof, show examples of the disclosure.

It is to be understood that the examples shown in the drawings and/or discussed herein are non-exclusive and that there are other examples of how the disclosure may be practiced.

The description below is within the context of locking/unlocking and carrying a PV panel with a glass pane. However, it will be appreciated that the present subject matter can be applied to other situations of locking and carrying other appropriate objects in accordance with the present subject matter.

For example, other types of objects with a relatively flat surface, including other types of panels may be attached to a supporting structure/unattached and carried. These other types of panels may include, but are not limited to, a solar panel used in a water heating system, a decorative panel, a panel for a roof vent fan, etc. Similarly, a wooden or plastic surface may be locked/unlocked to/from a supporting frame using methods and systems describe below.

In some cases, the panel has at least a portion that is magnetically neutral, so that if an object with ferromagnetic properties is placed on a first side of the panel and a magnet is placed on a second side of the panel, e.g. opposite to the first side of the panel, the object will be attracted to, and held in place by the magnetic field of, the magnet.

Reference is now made to FIG. 1A, which shows a support structure 10 and locking mechanism for at least one photovoltaic (PV) panel. The support structure, presented as one possible example for a support structure, includes vertical outer support beams 110A, 110B and horizontal outer support beam 120. The example presented in FIG. 1A is not meant to be limiting, and other support structures are also possible. The framework may also include inner support beams 130A, 130B. The term "inner," as used in the phrase "inner support beams" is intended to be descriptive. Meaning, such inner support beams 130A, 130B are disposed beneath an inner portion of the PV panel 100, and not at the edges of the PV panel 100 (as is the case with vertical outer support beams 110A, 110B and horizontal outer support beam 120).

A ferromagnetic lock flap 180, a dovetail latch 190, and second dovetail latch 197, are shown in one possible configuration as being attached to and or partly inside inner support beams 130A, 130B. The ferromagnetic lock flap 180 and the dovetail latch 190 comprise portions of a PV panel locking mechanism, as will be described below, in greater detail.

Figure 1B:
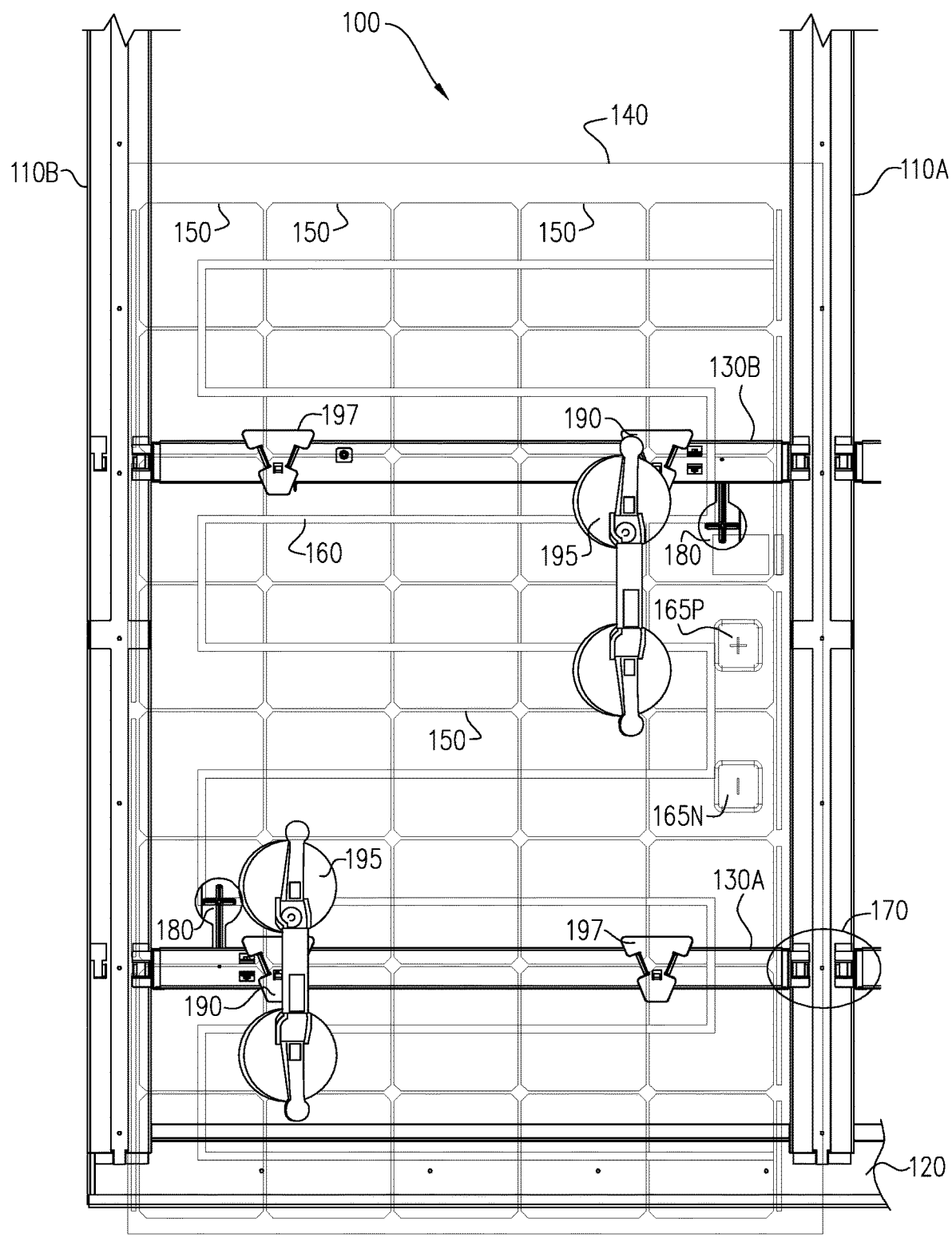
FIG. 1B shows a frameless PV panel resting on the support structure of FIG. 1A, as described herein below.

Reference is now made to FIG. 1B, which depicts a photovoltaic (PV) panel 100 resting on the support structure 10. The support structure 10 provides a framework including vertical outer support beams 110A, 110B and horizontal outer support beam 120. Vertical outer support beams 110A, 110B and horizontal outer support beam 120 are disposed around and support an outer portion/edges of the PV panel 100. FIG. 1B presents a high-level depiction of the framework and a locking apparatus, which will be described in greater detail below, with reference to FIGS. 2-10. The PV panel 100 is depicted as a frameless PV panel. However, the depiction in FIG. 1B of the PV panel 100 as being a frameless PV panel is not meant to be limiting.

Vertical outside support beams 110A and 110B are substantially parallel to one another, and are generally aligned along parallel first and second "side" edges of the frameless PV panel 100, respectively. Horizontal outside support beam 120 is generally aligned along a third "bottom" edge of the frameless PV panel 100, and is disposed generally perpendicularly to the vertical outside support beams 110A and 110B. In this case, the first and second edges are longer than the third edge. The vertical outside support beams 110A, 110B, and horizontal outside support beam 120 as depicted in FIGS. 1A and 1B may be part of/attached to a larger framework of support beams for PV panels (which may be frameless PV panels, such as PV panel 100), which may be disposed in a solar energy harvesting installation. Such solar energy harvesting installations may have relatively large numbers of PV panels (e.g. tens, hundreds, or thousands of PV panels, each of the PV panels being similar to PV panel 100). Solar energy harvesting installations may be, for example, a solar energy farm, or a household solar installation, and may be found, for example, on a rooftop of a domicile. A PV panel, such as PV panel 100, will have one side (typically the side that is opposed to the support structure 10) which is photovoltaicly active and responds to sunlight by generating DC electricity, and a second side (typically, the side which is facing the support structure 10) which is photovoltaicly neutral and does not respond to sunlight.

The inner support beams 130A, 130B are substantially parallel to horizontal outer support beam 120, and are disposed generally parallel to the third "bottom" edge of the frameless PV panel 100. Inner support beam 130A and inner support beam 130B are each typically attached on one end to vertical outer support beam 110A, and on the other end to vertical outer support beam 110B. A support beam locking mechanism, including a locking slot 170 (described below with reference to FIGS. 2A and 2B) enables locking inner support beam 130A and inner support beam 130B to interlock with vertical outer support beams 110A, 110B.

The PV panel 100 typically includes a sheet of glass 140, which is disposed over a plurality of photovoltaic cells 150. A length of conductive material 160 electrically connects the plurality of photovoltaic cells 150 to each other, thereby joining the plurality of photovoltaic cells 150 into a string of photovoltaic cells. A positive terminal 165P and a negative terminal 165N may be provided so that electricity generated by the PV panel 100 may be output from the PV panel 100 to a solar energy harvesting system (not shown).

As will be described below with reference to FIGS. 2A-4, the support structure 10 may be designed and built with corresponding connection elements on the inner and outer support beams which may be used to enable locking and unlocking of the support beams to and from one another. The corresponding connection elements may be part of a support beam locking mechanism 200, which is described below with reference to FIGS. 2A-4.

As will be described below with reference to FIGS. 5-8, a panel locking mechanism 301 (FIG. 5) may be used to reversibly attach the PV panel to the support structure 10. The panel locking mechanism 301 may include, for example, a ferromagnetic lock flap 180/340, a tongue 370 (FIG. 7B), and the dovetail latch 190/320. The ferromagnetic lock flap 180/340 may be arranged to help lock the PV panel 100 to the inner support beams 130A, 130B in order to keep the PV panel 100 in place. A tongue 370 (FIG. 7B) which is actuated by the ferromagnetic lock flap 180/340 may engage or disengage into the dovetail latch 190/320. The dovetail latch 190/320 is configured to be physically attached (e.g., by glue or other appropriate adhesive) to the PV panel 100 when tongue 370 is actuated, in order to lock the PV panel 100 to inner support beams 130A, 130B. In an engaged position, ferromagnetic lock flap 180/340 causes the tongue 370 to enter the dovetail latch 190/320 through a hole in the inner support beams 130A, 130B (as shown in FIG. 7C), thereby holding the PV panel 100 locked to the inner support beams 130A, 130B. In a disengaged position, the ferromagnetic lock flap 180/340 causes the tongue 370 to disengage from the dovetail latch 190/320, thereby releasing the PV panel 100 so that it is now unlocked from the inner support beams 130A, 130B.

For example, an installer may maintain the ferromagnetic lock flap 180/340 in a disengaged position during the process of installation of the PV panel 100. Once the PV panel 100 has been installed, however, the installer may actuate the ferromagnetic lock flap 180/340 to engage the tongue 370 to the dovetail latch 190/320, thereby locking the PV panel 100 to at least one of the intermediate support beams 130A, 130B. Alternatively, if, for some reason, the PV panel 100 is to be removed, for example, in order to replace the PV panel 100, then the installer may first deactivate the ferromagnetic lock flap 180/340 in order to disengage tongue 370 from the dovetail latch 190/320, thereby unlocking the PV panel 100 from the inner support beams 130A, 130B, and allowing removal of the PV panel 100 from the support structure 10. Second dovetail latch 197 provides additional stabilization to the PV panel 100.

Once installed on the support structure 10, one PV panel rests on the framework formed by vertical outer support beams 110A, 110B, horizontal outer support beam 120, and inner support beams 130A, 130B. The one PV panel, such as PV panel 100 depicted in FIG. 1B is locked to the framework by the locking mechanism at two dovetail latches 190/320 (a first one on the left of inner support beam 130A, and a second one diagonally opposed to the first one, on the right of inner support beam 130B). Additionally, for further stability, two diagonally opposed second dovetail latches 197 are provided. Utilizing these four dovetails to attach the PV panel 100 to the framework provides redundancy as well.

As will be described below with reference to FIGS. 9 and 10, an unlocking/carrying mechanism may be used to help unlock the panel locking mechanism 301 from the support structure 10, and to help transport/maneuver the PV panel 100. The unlocking/carrying mechanism 301 may include a suction cup mechanism 195, which is described below with reference to FIGS. 9 and 10. Suction cup mechanism 195 may be attached to the sheet of glass 140 and be used to maneuver the PV panel 100 (e.g., in order to help carry and/or adjust the PV panel to install or to remove the PV panel 100). Suction cup mechanism 195 may include a magnet (described below with reference to FIG. 10), which may engage with and raise the ferromagnetic lock flap 180/340, thereby releasing the tongue 370 from the dovetail latch 190, and unlocking/detaching the PV panel 100 from the support structure 10.

Reference is now made to FIGS. 2A-4, which shows a detail of a support beam locking mechanism 200 including corresponding connection elements, for connecting support beams to one another. Support beam locking mechanism 200 includes a first corresponding connection element/portion, which may be disposed in a first support beam 225, and a second corresponding connection element/portion, which may be disposed in a second support beam 228. First support beam 225 may be the same as or similar to one of the vertical outer support beams 110A, 110B of FIGS. 1A and 1B. Second support beam 228 may be the same as or similar to one of the inner support beams 130A, 130B of FIGS. 1A and 1B. The first corresponding connection element/portion may include the locking slot 170 with a flexible tongue 210 on the first support beam 225. The second corresponding connection element/portion may include tabs 235, 245 on the second support beam 228.

Figure 2A:
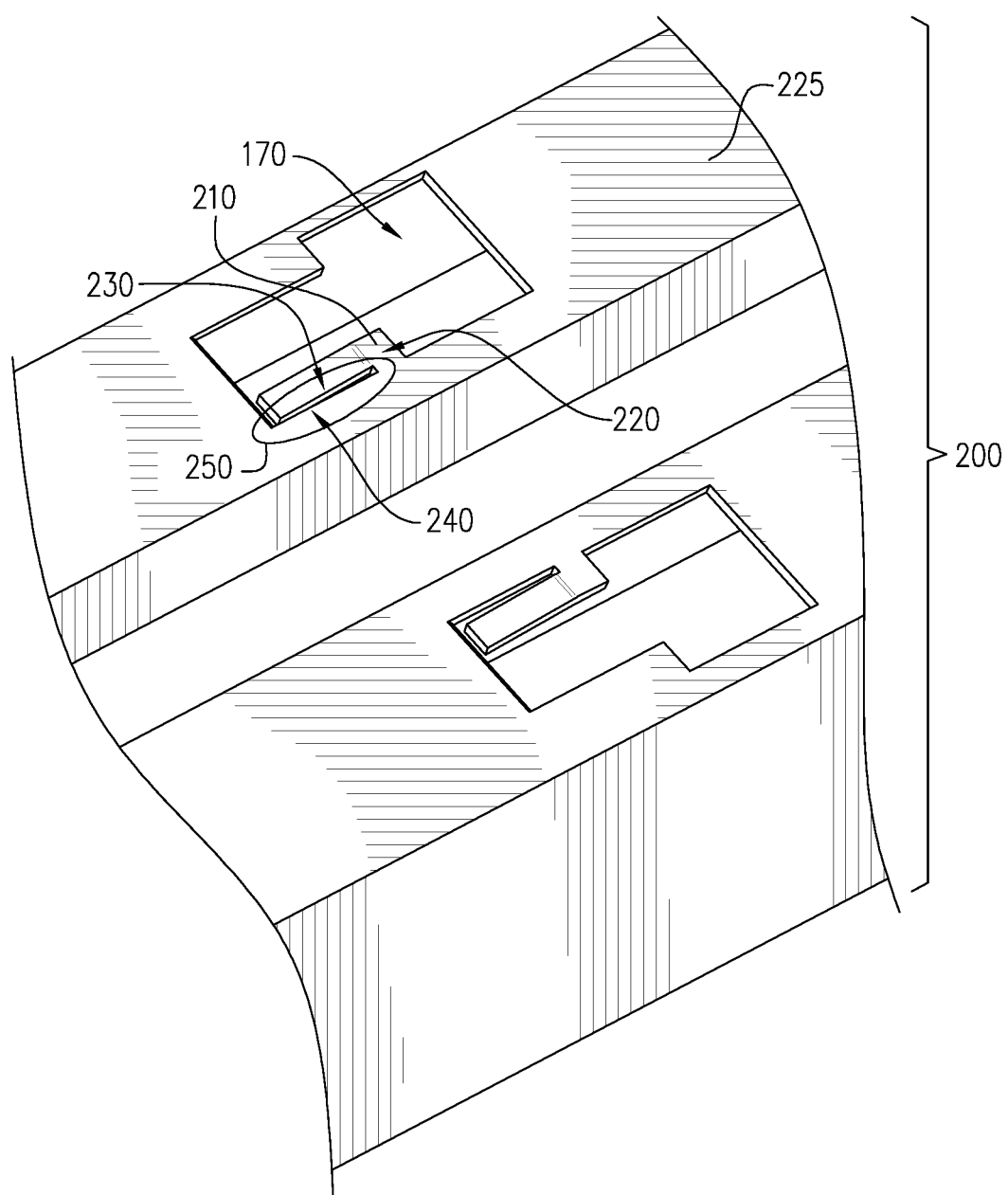
FIG. 2A shows a detail of a locking slot in one of the outer support beams, such as the outer support beams of FIG. 1A.
Figure 2B:
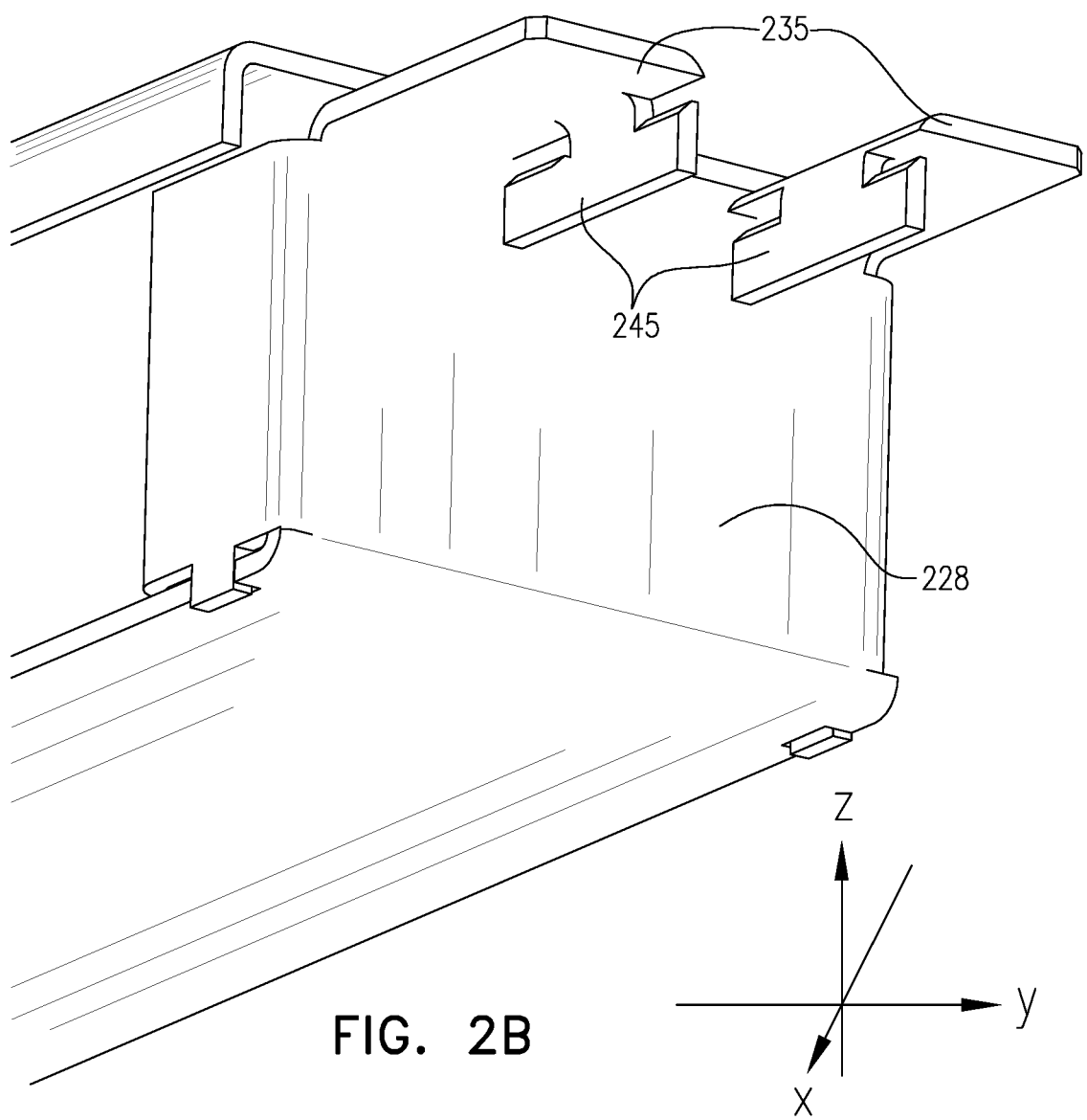
FIG. 2B shows a detail of one end of an inner support beam.

Reference is now made to FIG. 2B, which shows a detail of one end of the second support beam 228. FIG. 2B illustrates the corresponding connection element/portion of the support beam locking mechanism 200 that is on the second support beam 228. In this case, the corresponding connection element includes tabs 235, 245 on second support beam 228. A first pair of tabs 235 extend off of sides of second support beam 228 (note that only one end of second support beam 228 is shown in FIG. 2B). A second pair of tabs 245 is disposed perpendicular to and descend in a direction indicated by a z-axis, off of the first pair of tabs 235.

Figure 3:
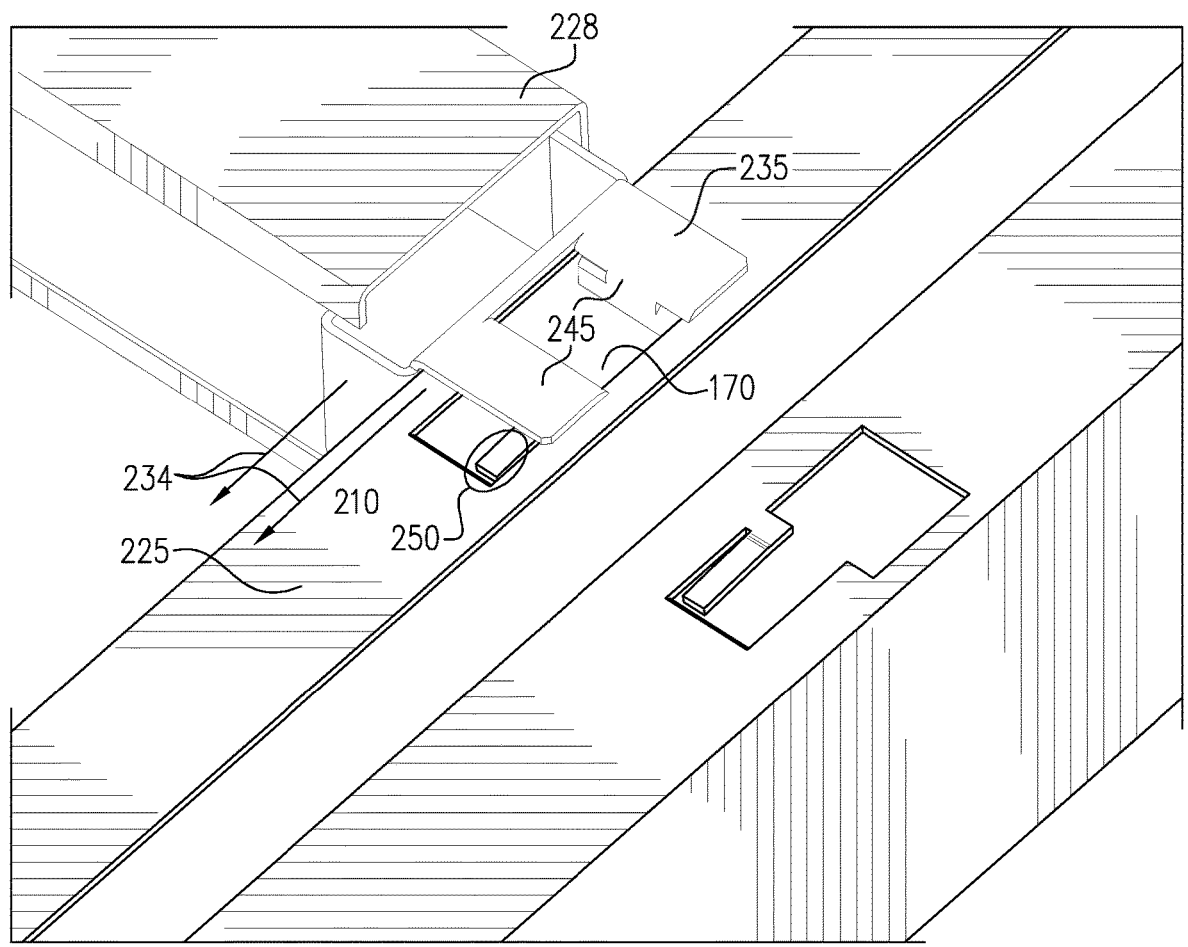
FIG. 3 shows a detail of an inner support beam in an unlocked position on one of the outer support beams of FIG. 2A.
Figure 4:
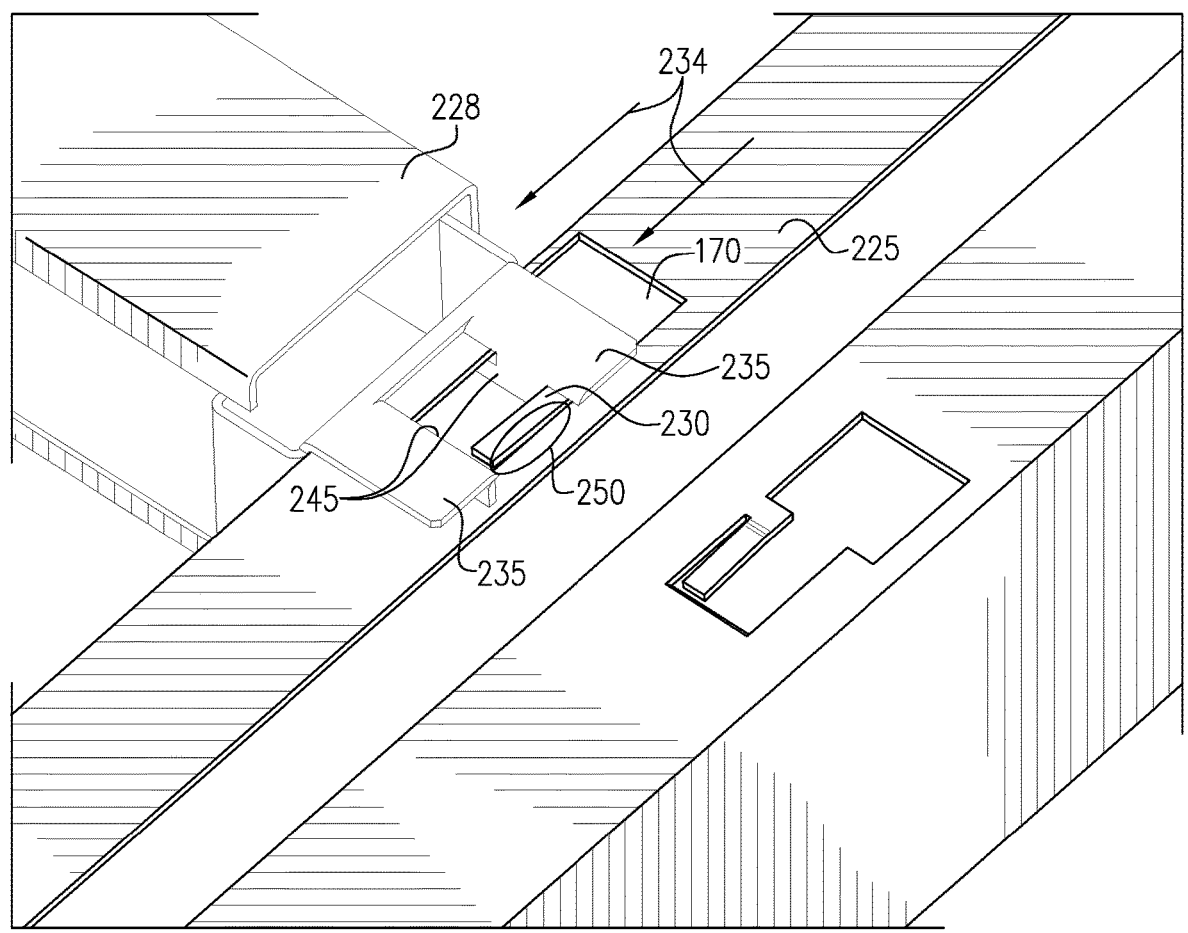
FIG. 4 shows a detail of an inner support beam in a locked position on one of the outer support beams of FIG. 2A.

The corresponding connection element/portion on the second support beam 228, in this case second pair of tabs 245, is inserted in the locking slot 170 of the first support beam 225. As shown in FIGS. 3 and 4, once inserted, the second support beam 228 may slide, in a direction indicated by a pair of arrows 234 depicted in FIGS. 3 and 4, so that the second support beam 228 engages a flexible tongue 210 of the support beam locking mechanism 200, thereby being locked in place, as will be described in greater detail below with reference to FIG. 4.

The flexible tongue 210 may be disposed on one side of the locking slot 170. The flexible tongue 210 is held in place by a first part 220, which may be fully joined at one side to the first support beam 225. A second part 230 of the flexible tongue 210 may extend along an inside edge 240 of the locking slot 170, while not being attached along the inside edge 240 of the locking slot 170. Accordingly, a space 250 is created between the inside edge 240 and the second part 230. When the second support beam 228 is slid into place (as is indicated by the pair of arrows 234 in FIGS. 3 and 4), the second part 230 is depressed by the second support beam 228. However, when the second support beam 228 is completely engaged in the locking slot 170 (as in FIG. 4), the flexible tongue 210 is no longer depressed. The second support beam 228 can no longer slide into the position shown in FIG. 3, as the flexible tongue 210 is now blocking such reverse motion, thereby locking the second support beam 228 to the first support beam 225.

As shown in FIG. 3, one end of the second support beam 228 is inserted into the locking slot 170, such that at least one tab of the second pair of tabs 245 is inserted in the space 250 between the second part 230 and the inside edge 240 of the first support beam 225. The second support beam 228 is then slid in the direction indicated by the pair of arrows 234, into the position shown in FIG. 4. Flexible tongue 210 is depressed by the second support beam 228 while the action of sliding the second support beam 228 is in progress, so that the second support beam 228 depresses the flexible tongue 210. Once engaged in the position shown in FIG. 4, however, the second support beam 228 is blocked from returning to the position shown in FIG. 3, because the flexible tongue 210 serves to block reverse motion by the intermediate support beam 225, thereby locking the second support beam 228 to the first support beam 228.

The above description of assembly and attachment of the intermediate support beam 225 to the vertical outer support beams 110A, 110B and horizontal outer support beam 120 is an example of one method for performing such attachment. Persons of skill in the art will understand that the above description is by way of example only, and is not meant to be limiting or excluding of any other appropriate method.

Figure 5:
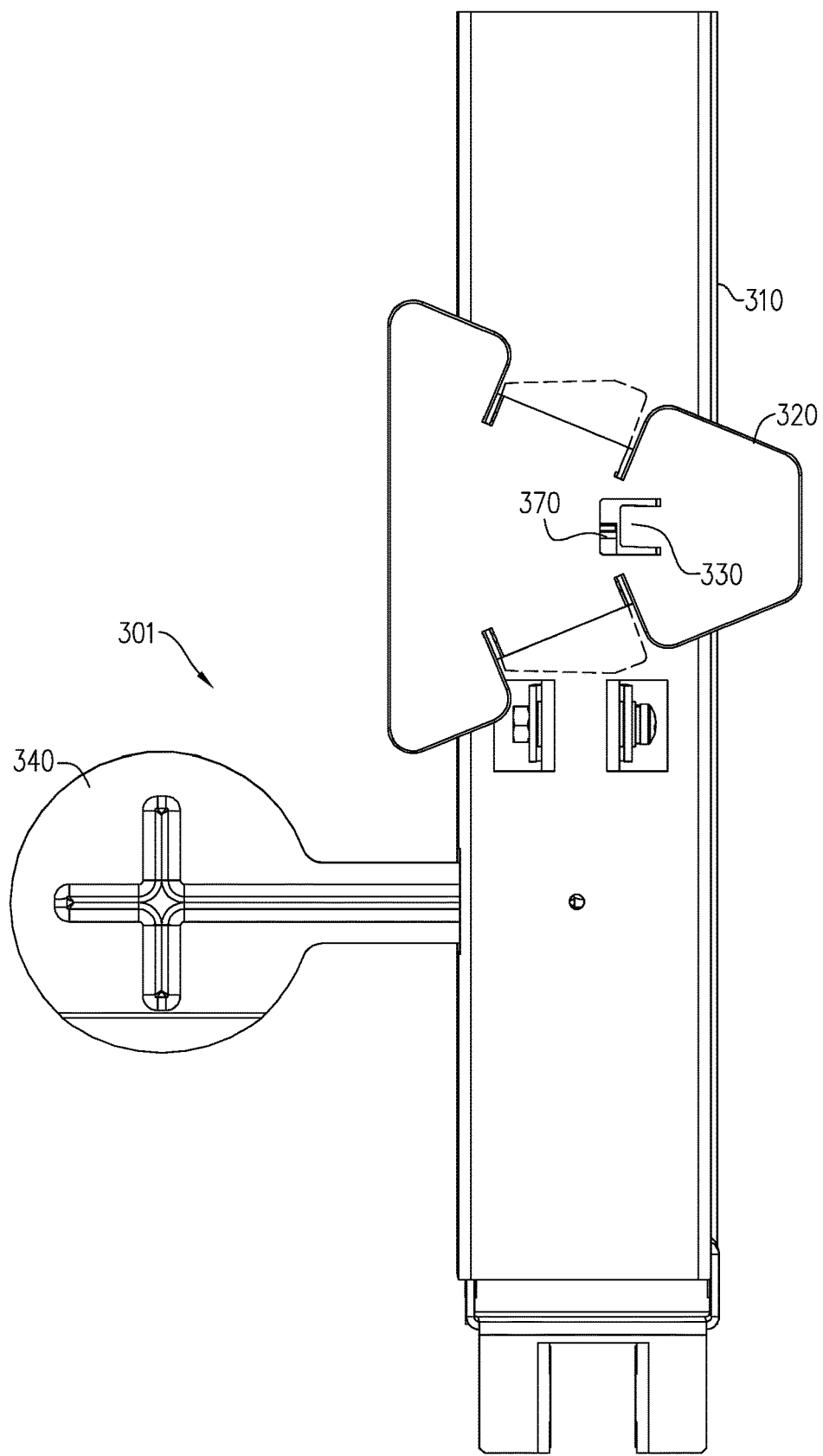
FIG. 5 shows a mechanism which may be attached to an underside of a PV panel, for locking the PV panel to a support beam.

Reference is now made to FIG. 5, which shows a panel locking mechanism 301. Panel locking mechanism 301 includes, for example, a latch 320, a flap 330, a ferromagnetic lock flap 340, and a tongue 370, which will be described in greater detail below. Panel locking mechanism 301 may be attached to an underside of a PV panel, such as frameless PV panel 100, (i.e., a side which is not operative to absorb sunlight and convert the sunlight to DC electricity), for locking the PV panel to a support beam, typically an inner support beam. By way of example, the panel locking mechanism 301 may be attached with glue or other adhesive material, which is resistant to appropriate environmental or elemental factors. For example, a glue or adhesive susceptible to extreme heat or extreme cold may not be appropriate for use in locations where such extreme temperature conditions may be prevalent.

In some cases, however, the locking mechanism described herein may be designed to lock the PV panel to the outer support beams, such as vertical outer support beams 110A, 110B and horizontal outer support beam 120.

Inner support beam 310 (which may be the same as or similar to inner support beams 130A, 130B, and second support beam 228) interlocks with the latch 320. The latch 320 may be the same as or similar to the dovetail latch 190 described above, with reference to FIG. 1.

In some aspects, the latch 320 may be designed to have a generally dovetail-like shape, as depicted in FIGS. 1, and 5-7B. The dovetail-like shape is used in instances when a corresponding slot (not shown) may receive the dovetail-like shaped item (in this case, the latch 320). For instance, a slot on the PV panel 100 may be shaped to receive the latch 320. When a dovetail-like shaped item is in place, it is typically resistant to forces, which push the item out of position. It is appreciated that the depiction of the latch 320 as having a dovetail-like shape is by way of example, and other appropriate shapes, as are known in the art, which may have their own properties, may be used for the latch 320.

Figure 7A:
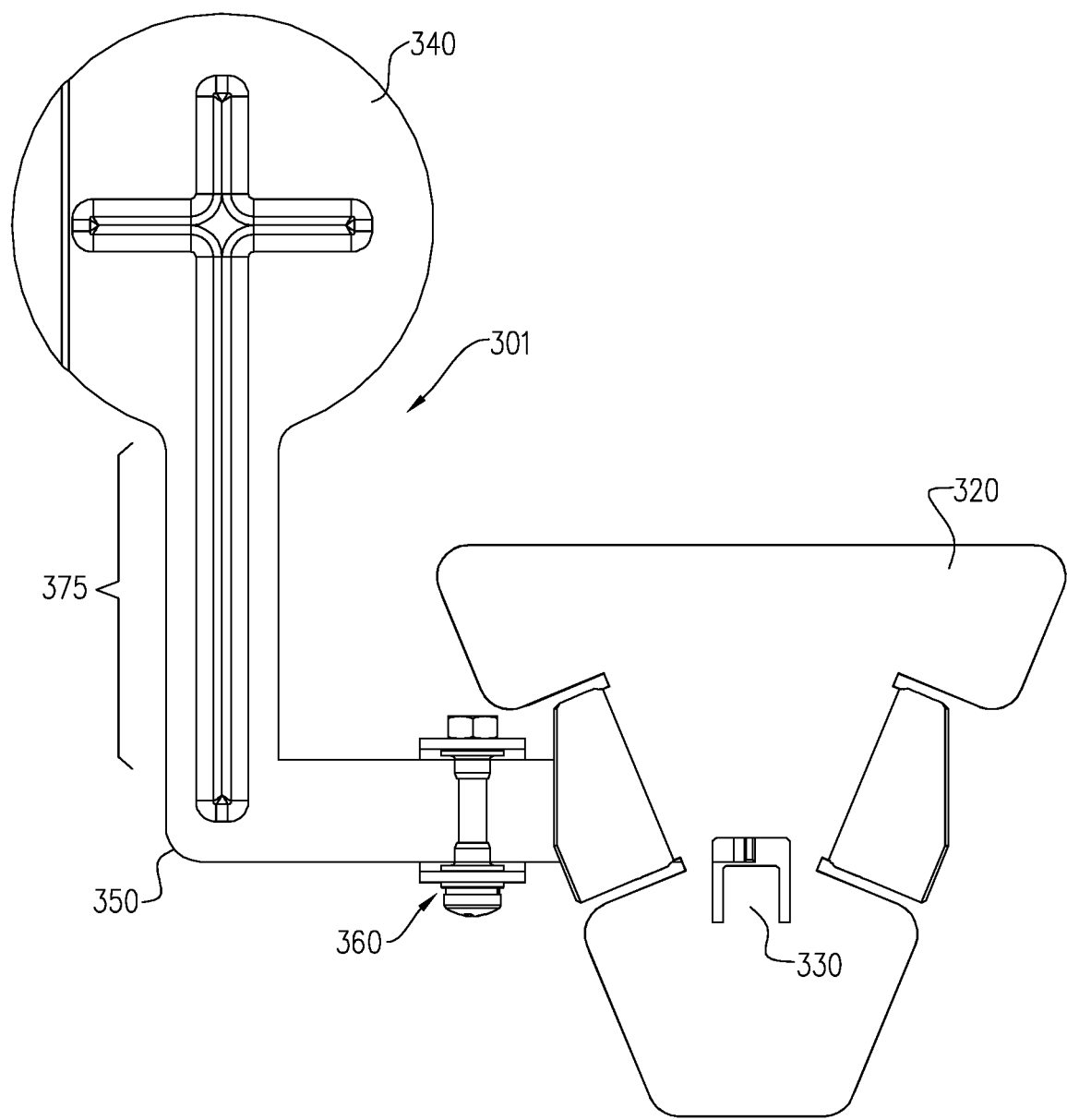
FIG. 7A shows a first detail of the mechanism of FIG. 5.
Figure 7B:
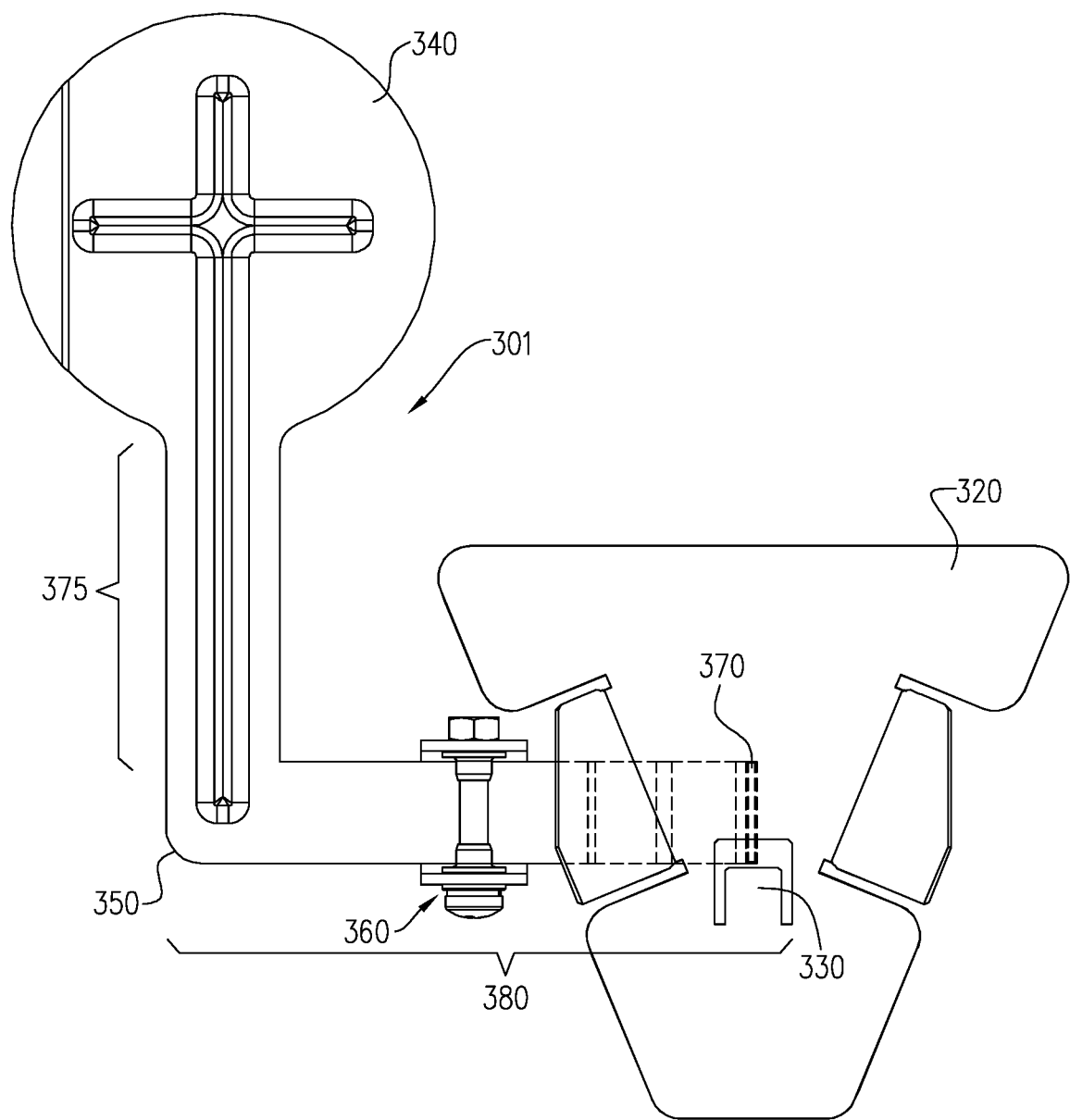
FIG. 7B, shows a first detail of the mechanism of FIG. 5 with the latch shown in a semi-transparent manner.
Figure 8:
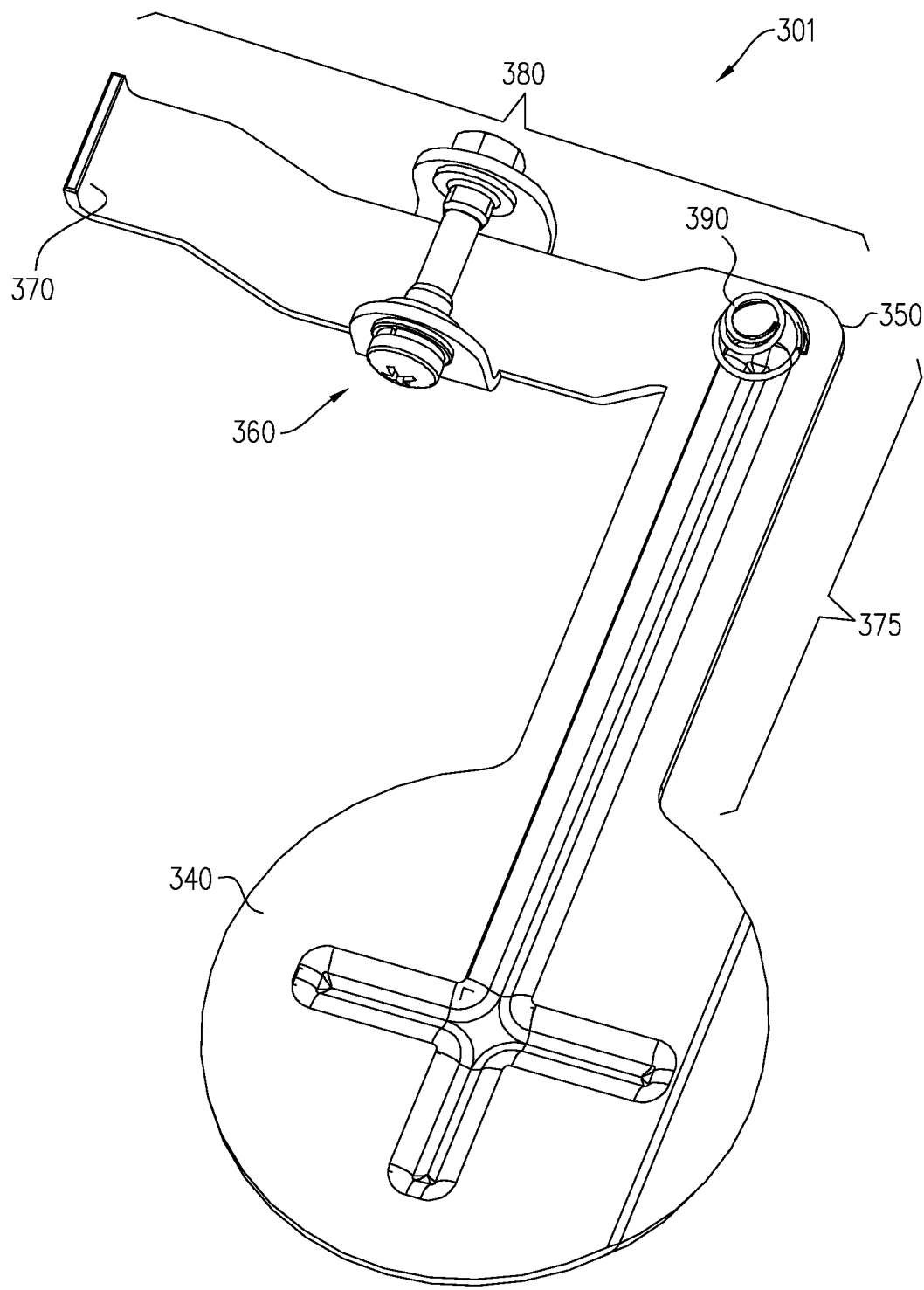
FIG. 8 shows a detail of the mechanism of FIG. 5.

When the locking mechanism 301 is engaged, the flap 330 engages the tongue 370 (note that in FIG. 5, the tongue 370 is mostly occluded, however, see FIGS. 7B and 8, where the tongue 370 is depicted more clearly). The tongue 370 is raised to an engaged position or lowered to a disengaged position by the raising/lowering ferromagnetic lock flap 340, which may be the same as or similar to ferromagnetic lock flap 180 of FIG. 1. Specifically, when the ferromagnetic lock flap 340 is raised, the tongue 370 is in a disengaged position, and the locking mechanism is unlocked. When the ferromagnetic lock flap 340 is lowered, the tongue 370 is in an engaged position, and the locking mechanism is locked. The mechanics of raising and/or lowering the tongue 370 are described below.

Note that depictions of elements in the figures may have a particular shape. By way of example, ferromagnetic lock flap 340 is depicted as having a round shape and extending from one side of a thinner and longer element (first member 375, discussed below with reference to FIGS. 6-8). In general, the shape of particular elements in the figures is not meant to be limiting.

Figure 6:
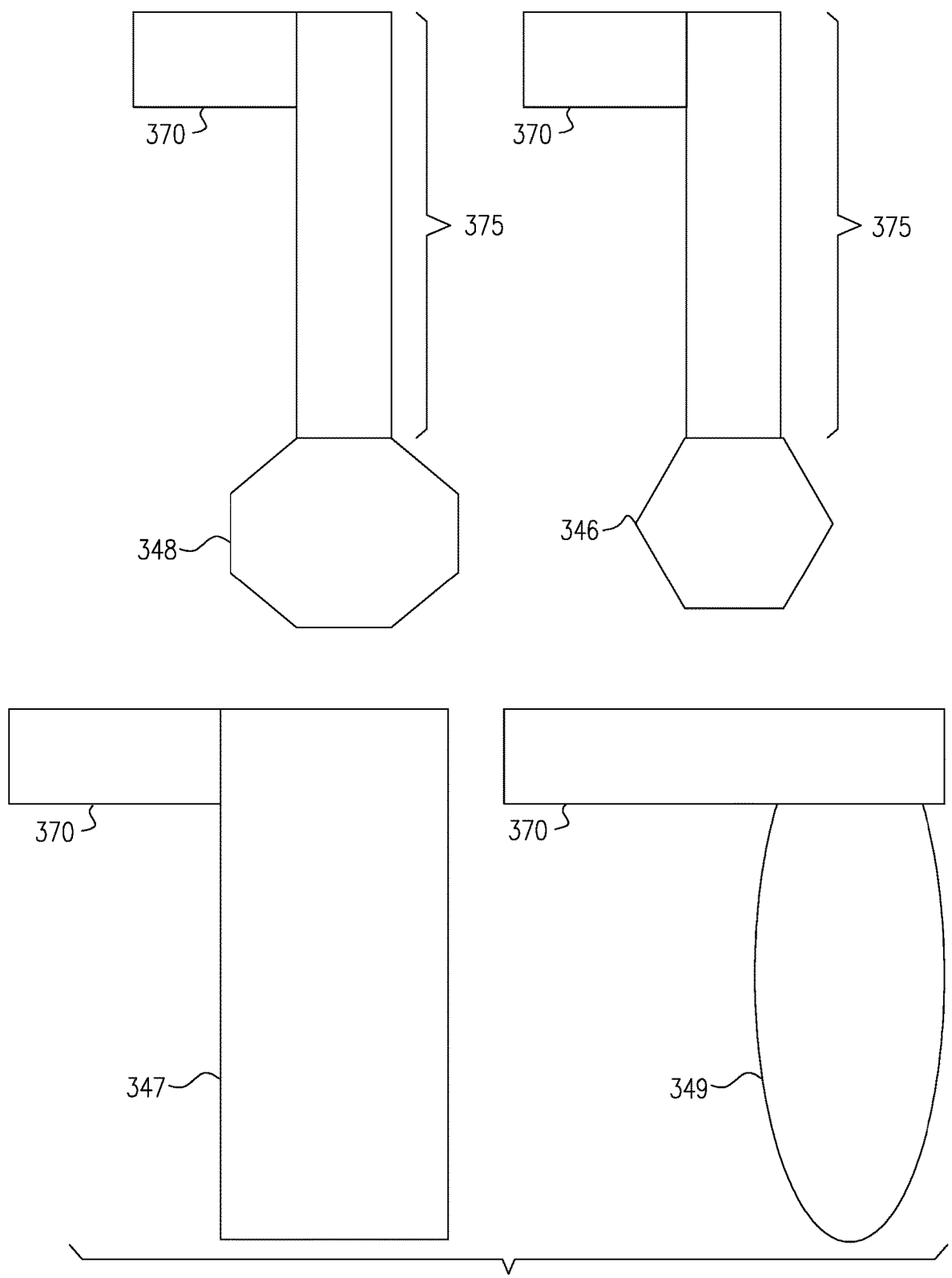
FIG. 6 shows alternative shapes, by way of example, for the ferromagnetic lock flap.
Figure 7C:
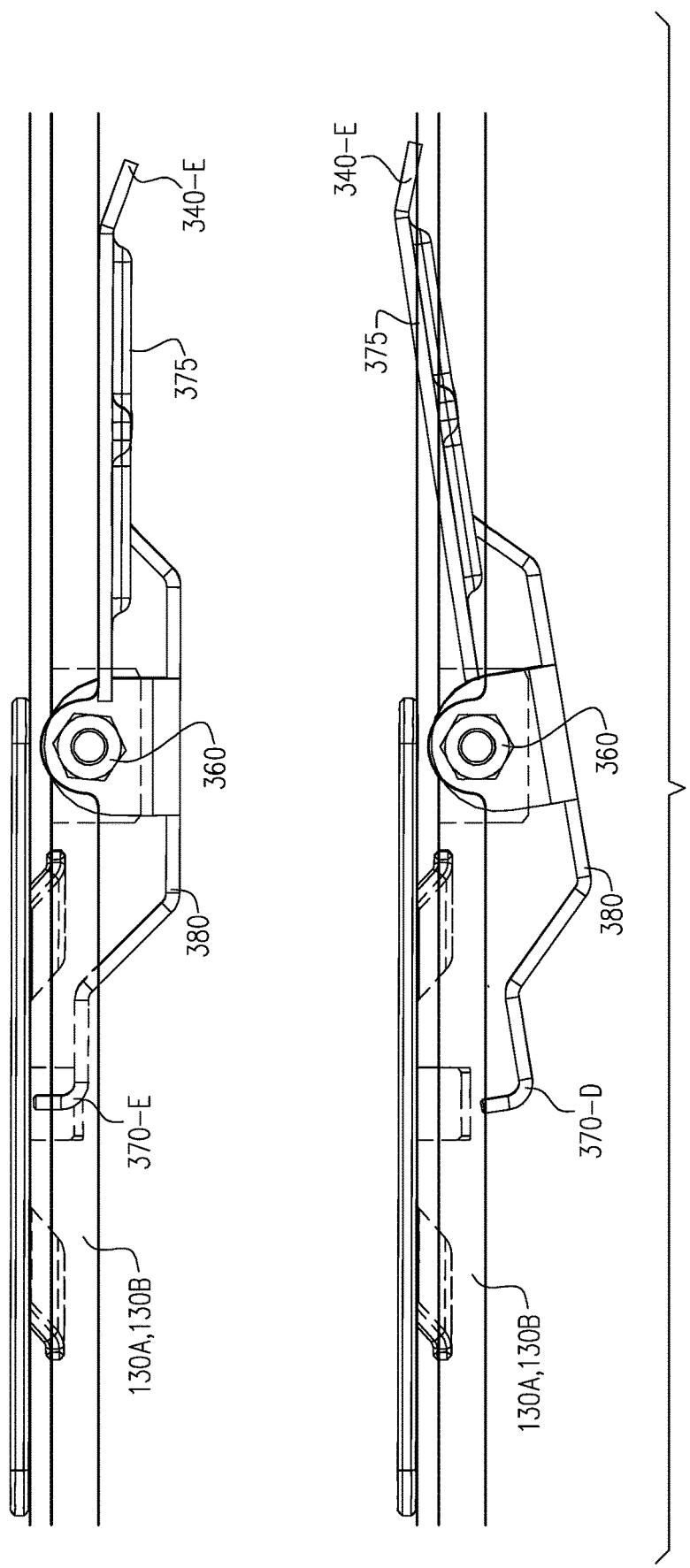
FIG. 7C shows a two side views of panel locking mechanism 301 of FIGS. 5-7B.

Reference is now made to FIG. 6, which shows, alternative shapes, by way of example, for the ferromagnetic lock flap 340. E.g., ferromagnetic lock flap might be a hexagon 346, or an octagon 348, or some irregular shape (not depicted). Furthermore, instead of ferromagnetic lock flap 340 being disposed at one side of the first member 375, the ferromagnetic lock flap 340 and the first member 375 might both be one large rectangular flap 347 or ovoid flap 349. Other examples, not provided here, where different shapes of the elements depicted in the figures might have the same functionality will be apparent to persons of skill in the art.

Reference is now made to FIG. 7A which shows a first detail of the panel locking mechanism 301 of FIG. 5. Reference is also made to FIG. 7B, which shows a second detail of the panel locking mechanism 301 of FIG. 5. In FIG. 7B, the latch 320 is shown in a semi-transparent manner, so that the tongue 370 is no longer occluded by the latch 320 and the flap 330. The ferromagnetic lock flap 340 has an elbow 350 forming a substantially 90 degree (i.e., right) angle between a first member 375, which terminates at the ferromagnetic lock flap 340 on one end and the elbow 350 on the other end, and a second member 380. The second member 380 includes a hinge 360 and the tongue 370, which protrudes off of one end of the second member 380 at a substantially 90 degree angle. Accordingly, the first member 375 and the second member 380 are hingedly attached.

Ferromagnetic lock flap 340 by design comprises at one end a member, which, due to gravity, weighs down first member 375. When ferromagnetic lock flap 340 is in a 'down position,' i.e., in an 'engaged position/state,' and is not actuated, elbow 350 is naturally pushed up by the weight of ferromagnetic lock flap 340 and the first member 375. When elbow 350 is pushed up, then it applies an upward force on second member 380. Accordingly, a center of gravity of the ferromagnetic lock flap 340 is located in the second member 380, as the upward force is applied to the hinge 360, the tongue 370 is pushed up, thereby engaging with the flap 330. Accordingly, the panel locking mechanism 301 of FIGS. 5-7B will be locked, and the PV panel 100 will be secured to the support structure 10 (FIG. 1A).

On, the other hand, when the ferromagnetic lock flap 340 is in an 'up position,' i.e., in a 'disengaged position/state,' (meaning that the ferromagnetic lock flap 340 is actuated, and is not weighing down the first member 375) minimal upward force (if any) may be applied at the elbow 350, and thus, the second member 380 is not pushed up. Accordingly, the tongue 370 is not pushed up by the hinge 360, and the tongue 370 does not engage with the flap 330. In such a case, the panel locking mechanism 301 of FIGS. 5-7B is not locked, and the PV panel 100 will not be secured to the support structure 10 (FIG. 1A).

Reference is now made to FIG. 7C, which shows a two side views of panel locking mechanism 301 of FIGS. 5-7B. In the depiction on the top of FIG. 7C, the locking mechanism is engaged, and tongue 370-E appears occulted, as it is within one of the intermediate support beams, such as intermediate support beams 130A, 130B. Ferromagnetic lock flap 340-E is depicted as being in its engaged position. In the depiction on the bottom of FIG. 7C, the locking mechanism is disengaged, and tongue 370-D can be seen, beneath one of the intermediate support beams, such as intermediate support beams 130A, 130B. Ferromagnetic lock flap 340-D is depicted as being in its disengaged position.

Reference is now made to FIG. 8, which shows a detail of the panel locking mechanism 301 of FIG. 5. Although the panel locking mechanism 301 is described in detail above, an additional feature which may be implemented in the panel locking mechanism 301 not discussed above is shown in FIG. 8. Optionally, a spring 390 may be disposed on the second member 380 on a side of the hinge 360. The spring 390 may be positioned/oriented in a way (in relation to the second member 380/hinge 360) which will result in the spring 390, when not compressed, exerting downward force, and therefore adding additional force on a distal side of the hinge 360. This additional force, applied when the ferromagnetic lock flap 340 is disengaged, and thus the tongue 370 is engaged, is applied so as to push the tongue 370 up (i.e., engaged with the flap 330), in the absence of any other factors which might otherwise cause the tongue 370 to disengage from the flap 330.

Figure 9:
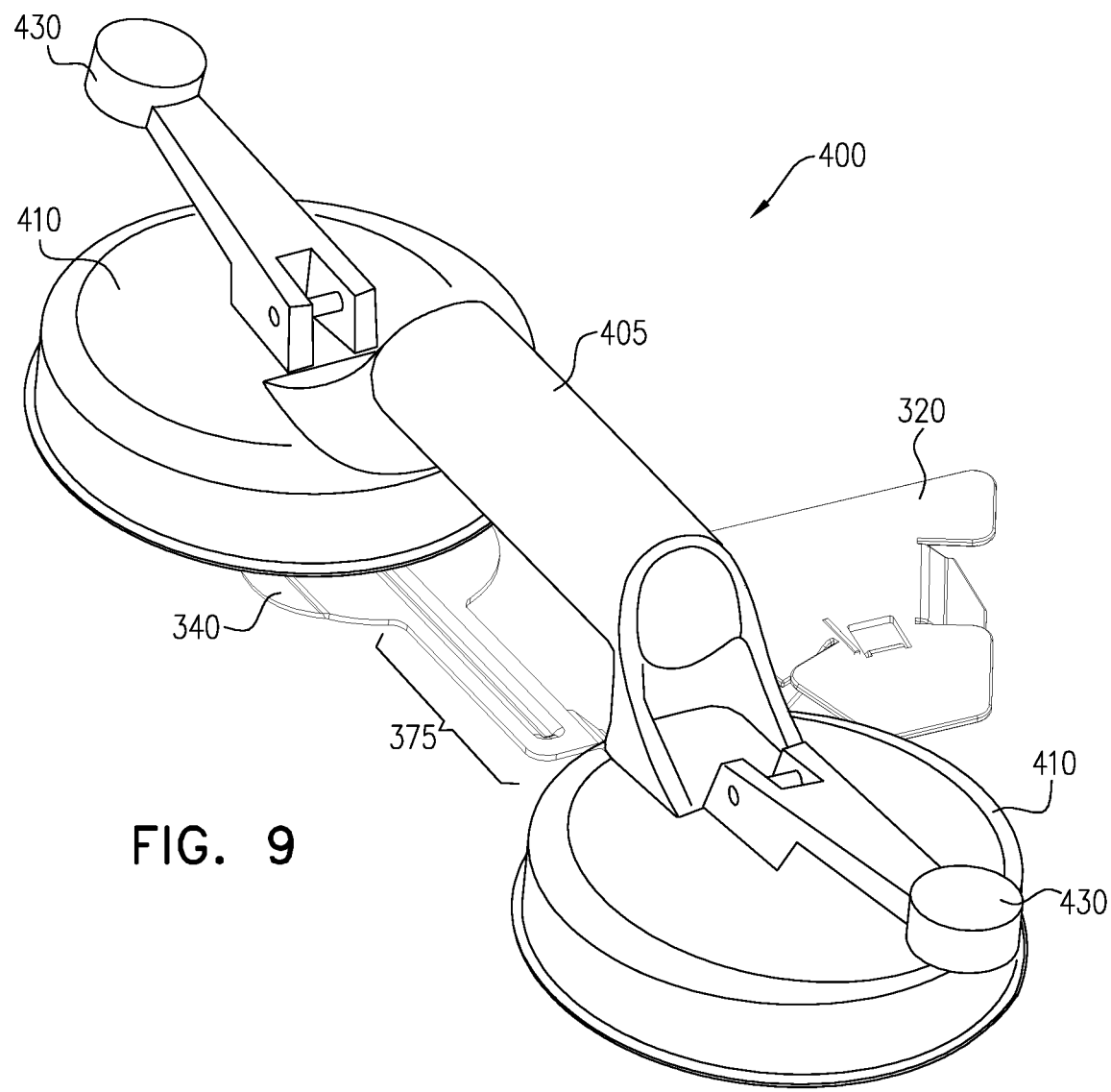
FIG. 9 shows a first view of an example of a suction cup mechanism for moving the PV panel.

Reference is now made to FIG. 9, which shows a first view of an example of a suction cup mechanism 400 for moving the PV panel (such as PV panel 100 of FIG. 1B). Reference is also made to FIG. 10, which shows a second view of the suction cup mechanism 400. As was noted above, when installing or replacing PV panel 100 on the support structure 10/the various support beams (such as vertical outer support beams 110A, 110B and horizontal outer support beam 120, inner support beams 130A, 130B, and so forth), the suction cup mechanism 400 may be attached to the glass of the panel by suction, thereby enabling the glass to be lifted or put in place. Because of the construction of the PV panel 100, when the glass is lifted up, the entire PV panel is lifted up along with the glass.

Figure 10:
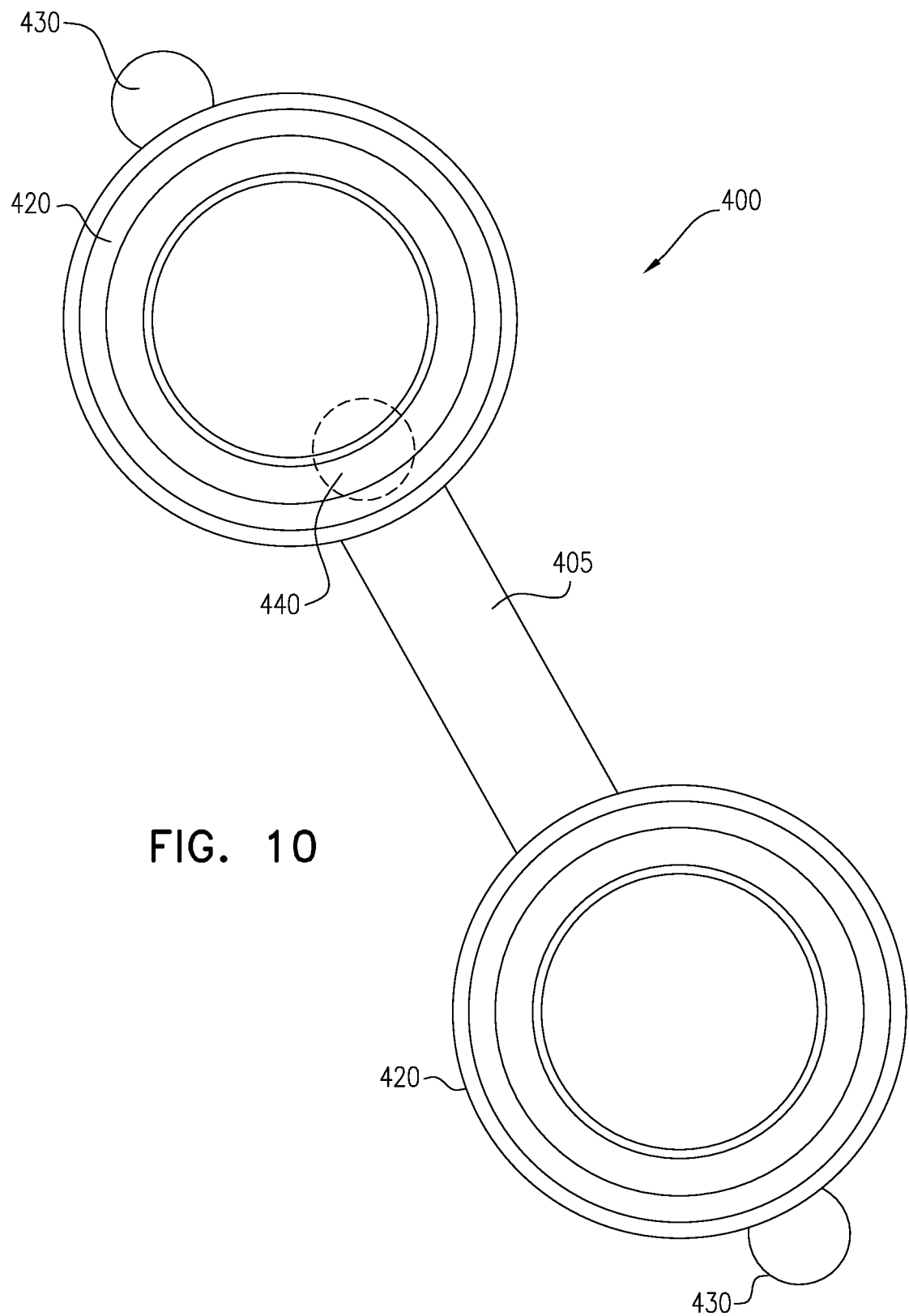
FIG. 10 shows a second view of the suction cup mechanism of FIG. 9.

The view of FIG. 9 is a view of the top of the suction cup mechanism 400 to be held by a user when carrying the glass/panel, and the view in FIG. 10 is a view of the bottom of the suction cup mechanism 400 to be attached to the glass/panel, as will be elaborated on herein below.

The suction cup mechanism 400 includes a handle 405, by which an installer, for instance, is able to hold the suction cup mechanism 400. When the suction cup mechanism 400 is attached to the glass 140 of the PV panel 100, the installer is able to maneuver the PV panel 100, for example to place the PV panel 100 on the support structure 10/framework of vertical outer support beams 110A, 110B and horizontal outer support beam 120 as described above with reference to FIGS. 1A and 1B. The handle 405 is attached to one or more suction cup cases 410. Each suction cup case 410 holds at least one suction cup 420 in place. One or more suction cups 420 are included in the suction cup mechanism 400. In the example of FIGS. 9 and 10, there are two suction cups 420 on opposite ends of the handle 405. In cases where there are a single suction cup 420, or three or more suction cups 420, they may be configured in an appropriate manner. The handle 405 is typically positioned so that weight of the glass (and, by extension, the PV panel 100) is equally distributed among the suction cups, when there is more than one suction cup) when a pane of glass, such as the glass 140, is attached to the suction cups 420. The suction cups 420 may be activated so that they form a vacuum and apply suction to the glass 140 of the PV panel 100 by raising or lowering a suction cup deactivation element 430, depicted as levers 430. Suction cups 420 may be deactivated by using suction cup deactivation element 430 to release the suction cups 420 by removing the vacuum, thereby releasing the suction cup mechanism from glass 140 and panel 100.

A magnet 440 is embedded between at least one of the suction cups 420 and its corresponding suction cup case 410. The magnet 440 may be a permanent magnet or an electromagnet. The permanent magnet may be a magnet having appropriate ferromagnetic properties, such as an iron magnet, a nickel magnet, a cobalt magnet, or a rare earth magnet, such as a neodymium or a samarium-cobalt magnet. If the magnet 440 is an electromagnet, then, for instance, a button or a lever (not shown) may be used to activate/deactivate the electromagnet using an appropriate electrical circuit. The button or the lever may be provided in an appropriate location, for example, on the body of the suction cup mechanism 400, e.g. in a proximity to handle 405 so that the button/lever can be actuated/deactivated while holding the handle 405. A battery (not shown) may be disposed within the body of the suction cup mechanism 400. The battery provides an electrical current to power the electromagnet when the electromagnet is activated. Additionally, instead of a single magnet, as depicted in FIG. 10, a plurality of magnets may be arranged in an appropriate pattern. As one non-limiting example, a disk, comprising 6, 8, or 10 rectangular or circular shaped magnets radially disposed around a central point in the disk may be disposed beneath suction cup 420.

FIG. 9 does not illustrate a panel, but a panel 100 may be disposed between panel locking mechanism 301 and suction cup mechanism 400 as illustrated in FIG. 1B.

As can be seen in FIG. 9, when the suction cup mechanism 400 is aligned over the ferromagnetic lock flap 340, the magnetic properties of the ferromagnetic lock flap 340 are such that the ferromagnetic lock flap 340 is attracted to the magnet 440. As described above, with reference to FIGS. 5-8, when the ferromagnetic lock flap 340 is in the raised "up position" or "disengaged position/state", tongue 370 is disengaged from the flap 330, and panel-locking mechanism 301 is in an unlocked state, allowing the panel 100 to be maneuvered. The suction cup mechanism 440 may also be secured to panel 100 to allow the carrying of panel 100 while the panel 100 is unlocked from the support structure 10.

The panel may then be moved. After the panel has been moved, suction cup mechanism may be deactivated. Then the magnet 440 can be brought out of alignment with the ferromagnetic lock flap 340, thereby once again locking the panel locking mechanism 301, and, for example, securing the panel 100 to the support structure 10.

Alternatively, if the magnet 440 is an electromagnet, then when the electromagnet is powered on, the ferromagnetic lock flap 340 is attracted to the magnet 440. In such a case the panel locking mechanism 301 will be in an "up position" or "disengaged position", and the tongue 370 will be disengaged from flap 330, thereby unlocking the panel locking mechanism 440, and unlocking panel 100 from support structure 10. In such a case, if the suction cup mechanism 400 is also secured to the panel 100, then it may be used to carry/maneuver the unlocked panel 100. When the magnet 440 is removed (either by physically moving the magnet 440 out of alignment with ferromagnetic lock flap 340 or by turning off the electromagnet), then the ferromagnetic lock flap 340 will fall into a "down position" or "engaged position" (e.g. due to the weight of ferromagnetic lock flap 340 and the effect of gravity on ferromagnetic lock flap 340) and the tongue 370 will thereby engage the flap 330. At such time, the PV panel 100 will, effectively, be locked to the support structure 10, e.g., intermediate support beams 130A, 130B. In such a case, if the suction cup mechanism 400 is no longer secured to the panel 100, then the suction cup mechanism 400 may be removed from the locked panel 100

In some aspects, the mechanism described above may be modified so that the latch is engaged and locked when the ferromagnetic flap is in the engaged position and is disengaged when the when the ferromagnetic flap is in the disengaged position. In such an aspect, by way of example, an electromagnet may be placed on the side of the panel away from the ferromagnetic flap, thereby drawing the ferromagnetic flap towards the panel, ensuring that the ferromagnetic flap, and thus the latch is in the engaged position. In such an aspect, the electromagnet may receive power from the solar panel (e.g., via a power converter connected to the solar panel), from a battery, from an inverter, or from an alternative power source.

Aspects of the invention include:

A magnetic locking mechanism which is engaged by engaging a magnet.

A magnetic locking mechanism which is disengaged by engaging a magnet.

A magnetic locking mechanism which is engaged by disengaging a magnet.

A magnetic locking mechanism which is disengaged by disengaging a magnet.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A device comprising:
   a ferromagnetic lock flap having an engaged position and a disengaged position;
   the ferromagnetic lock flap comprising:
      a first portion with ferromagnetic properties;
      a second portion configured to engage with a latch when in the engaged position; and
      a hinge that hingedly connects the first portion and the second portion;
   wherein the device comprises a locking mechanism disposed on a first side of a panel to be locked in place, at least a portion of the panel being magnetically neutral;
   wherein when the ferromagnetic lock flap is in the engaged position, the first portion is in a first position that forces the hingedly connected second portion to engage with the latch; and
   when the ferromagnetic lock flap is in the disengaged position, the first portion is in a second position that forces the hingedly connected second portion to disengage from the latch, thereby locking the locking mechanism, and wherein placing a magnet on a second side of the panel causes the ferromagnetic lock flap to enter the disengaged position.

2. The device of claim 1, wherein when the ferromagnetic lock flap is in the engaged position, the locking mechanism is unlocked.

3. The device of claim 1, wherein when the ferromagnetic lock flap is in the disengaged position, the locking mechanism is locked.

4. The device of claim 1, wherein placing a magnet on a second side of the panel unlocks the locking mechanism.

5. The device of claim 1, wherein the second side of the panel is photovoltaicly active and the first side of the panel is photovoltaicly neutral.

6. The device of claim 1, wherein the panel comprises a solar panel, and the locking mechanism locks the solar panel to a support structure.

7. The device of claim 6, wherein the solar panel is used for generating electricity.

8. The device of claim 6, wherein the solar panel is used for conversion of sunlight into heat for water heating.

9. The device of claim 6, wherein the solar panel comprises a frameless solar panel.

10. The device of claim 1, wherein the panel comprises a decorative panel, and the locking mechanism locks the decorative panel to a support structure.

11. The device of claim 1, wherein the panel comprises a roof vent fan, and the locking mechanism locks the roof vent fan to a support structure.

12. The device of claim 1, wherein the first portion of the ferromagnetic lock flap has a greater weight than the second portion of the ferromagnetic lock flap.

13. The device of claim 12 wherein the weight of the first portion applies a force in the direction of the panel on the second portion, thereby positioning the ferromagnetic lock flap in the engaged position and causing the second portion to engage the latch and lock the panel.

14. The device of claim 1, wherein, upon the ferromagnetic lock flap entering the engaged position, the first portion applies pressure on the hingedly connected second portion, thereby causing the second portion to be engaged in the latch.

15. The device of claim 14, wherein, upon the ferromagnetic lock flap entering the disengaged position, the first portion ceases to apply pressure on the hingedly connected second portion, thereby causing the second portion to be disengaged from the latch.

16. The device of claim 1, wherein the first portion is attached to a first member that comprises a first part and a second part, the first part attached to the first portion and comprising a larger surface area than a surface area of the second part, the second part comprising an elongated extension member which is longer than the first part, and is attached at one end to the first part.

17. The device of claim 16, wherein the first member is attached to a second member, the second member being attached to the hinge, and the second member being attached at one end to the first member and at another end to the second portion of the ferromagnetic lock flap.

18. The device of claim 17, wherein the first member and the second member form a substantially right angle with one another.

19. The device of claim 17, wherein a center of gravity of the ferromagnetic lock flap is located in the second member.

20. The device of claim 17, wherein a spring is disposed at a joint formed between the first member and the second member, the spring applying force in a direction away from the joint, thereby positioning the ferromagnetic lock flap in the engaged position.

21. The device of claim 1, wherein the magnet comprises an electromagnet.

22. The device of claim 1, wherein the magnet is disposed in a suction cup mechanism.

* * * * *